Figure 1:
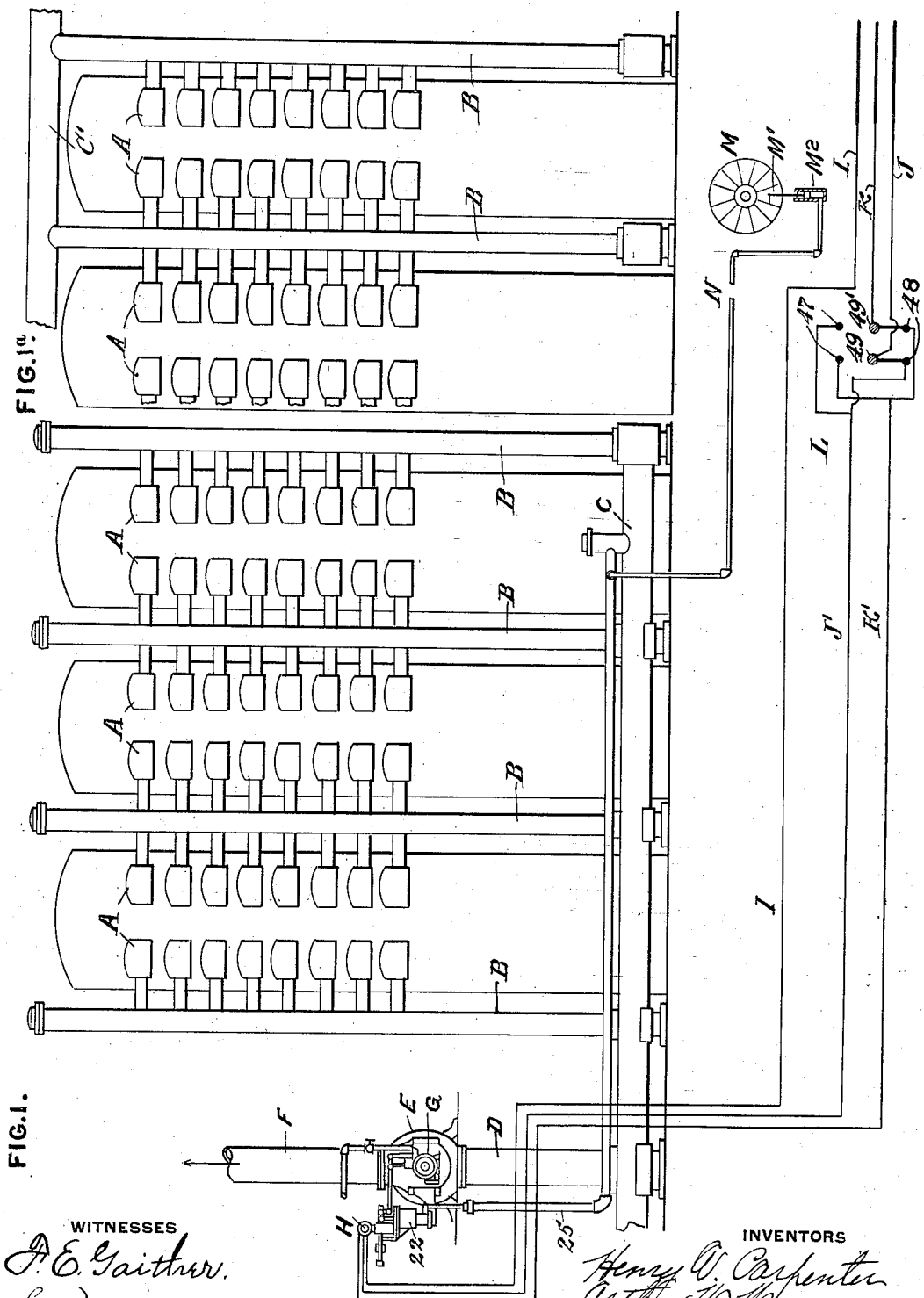

H. A. CARPENTER & A. W. WARNER.
PRESSURE CONTROL FOR GAS BENCHES.
APPLICATION FILED DEC. 13, 1913.

1,138,727.

Patented May 11, 1915.
4 SHEETS—SHEET 2.

WITNESSES

INVENTORS

H. A. CARPENTER & A. W. WARNER.
PRESSURE CONTROL FOR GAS BENCHES.
APPLICATION FILED DEC. 13, 1913.
1,138,727.
Patented May 11, 1915.
4 SHEETS—SHEET 3.
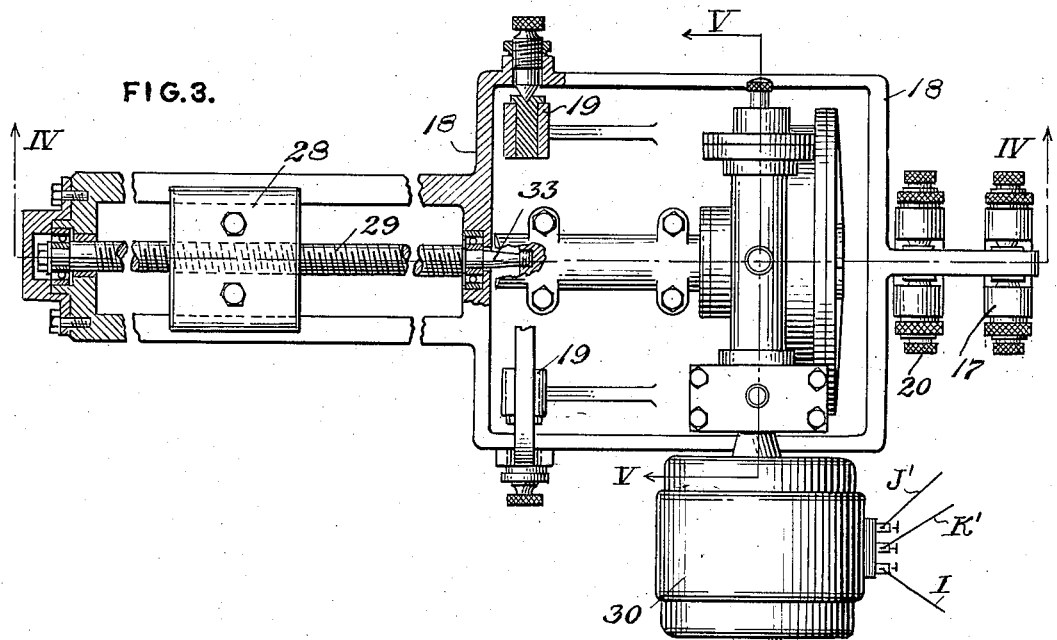
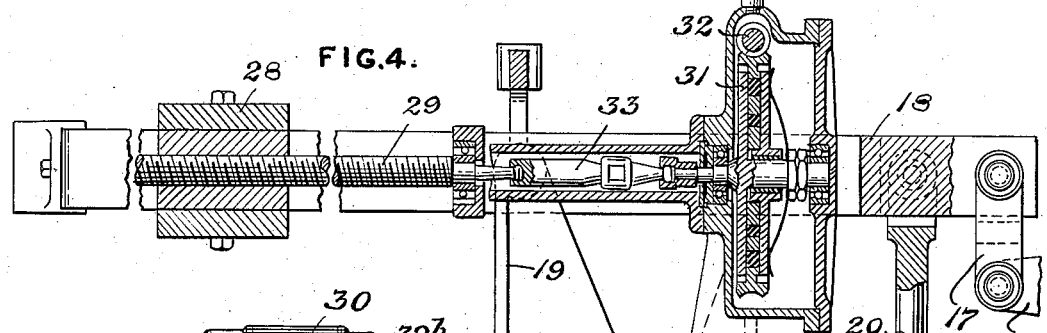
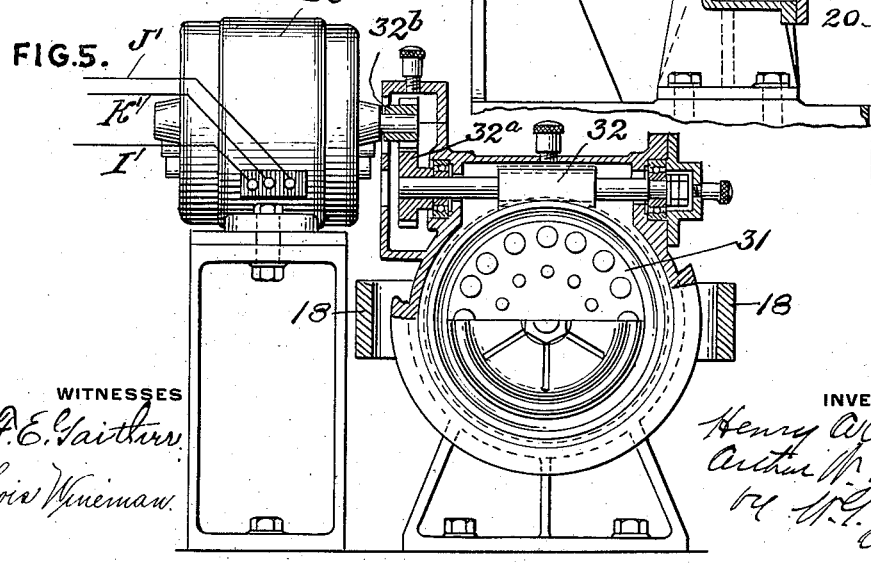
WITNESSES
INVENTORS H. A. CARPENTER & A. W. WARNER.
PRESSURE CONTROL FOR GAS BENCHES.
APPLICATION FILED DEC. 13, 1913.
1,138,727.
Patented May 11, 1915.
4 SHEETS—SHEET 4.
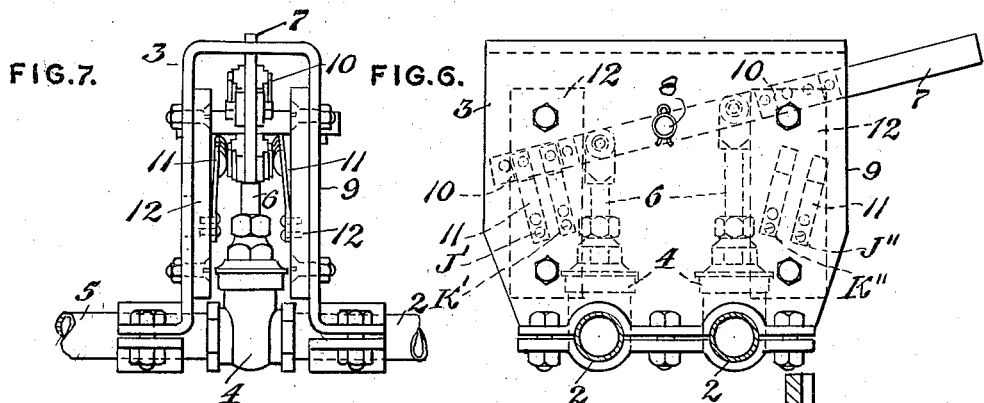
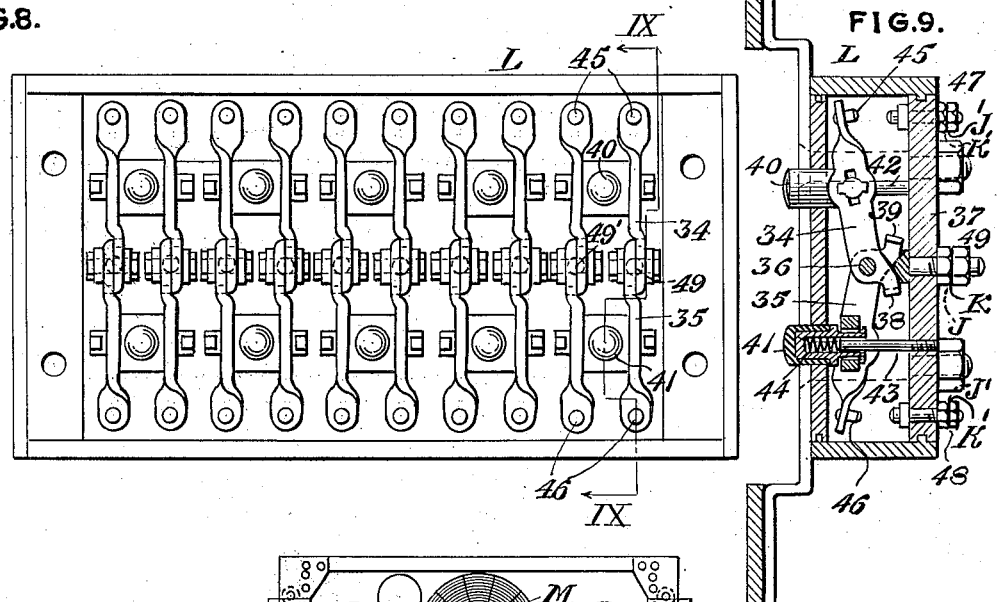
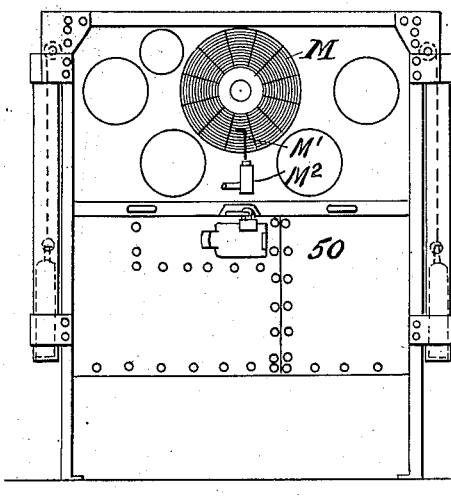

UNITED STATES PATENT OFFICE.

HENRY A. CARPENTER AND ARTHUR W. WARNER, OF SEWICKLEY, PENNSYLVANIA, ASSIGNORS TO RITER-CONLEY MANUFACTURING COMPANY, OF PITTSBURGH, PENNSYLVANIA, A CORPORATION OF NEW JERSEY.

PRESSURE CONTROL FOR GAS-BENCHES.

1,138,727.     Specification of Letters Patent.     Patented May 11, 1915.

Application filed December 13, 1913. Serial No. 806,413.

*To all whom it may concern:*

Be it known that we, HENRY A. CARPENTER and ARTHUR W. WARNER, citizens of the United States, residing at Sewickley, in the county of Allegheny and State of Pennsylvania, have invented certain new and useful Improvements in Pressure Control for Gas-Benches, of which the following is a specification.

In gas making plants such as is contemplated in this invention, it is a practice to arrange the gas retorts in benches, the retorts being so located that they are generally in vertical alinement and generally in horizontal alinement.

In the discharging and charging operation of the retorts, it is a common practice to discharge and charge all those in one horizontal row before charging those in another horizontal row, so, for the purpose of this invention, the row may be considered as horizontal rather than vertical. As is well known, the retorts are connected to a main by stand pipe connections, and during the discharging and charging operation, the doors of the retorts are necessarily open. If the pressure in the retorts exceeds that of the outside atmosphere at the entrance opening, the preponderating pressure within the retort will cause some of the gas to escape to the atmosphere. If, on the other hand, the pressure within the retort is less than that of the outside atmosphere, there will be an inrush of air into the retort which will find its way to the main through the stand pipe connection.

It is the purpose of this invention to provide means whereby there will be an equalization of the pressure at the retort entrance-opening so that there will be neither an influx of air nor a discharge of gas at the time of the discharge and charging of the retort.

One of the objects of the invention is to provide means whereby the pressure within the main, stand pipe connections, and within the retort may be regulated from some point either adjacent to or remote from the retorts, and a further object is to provide means whereby a predetermined pressure in the main will be maintained as well as a difference of pressure in the retort will be provided for by suitable mechanism contemplated by this invention.

Figure 2:
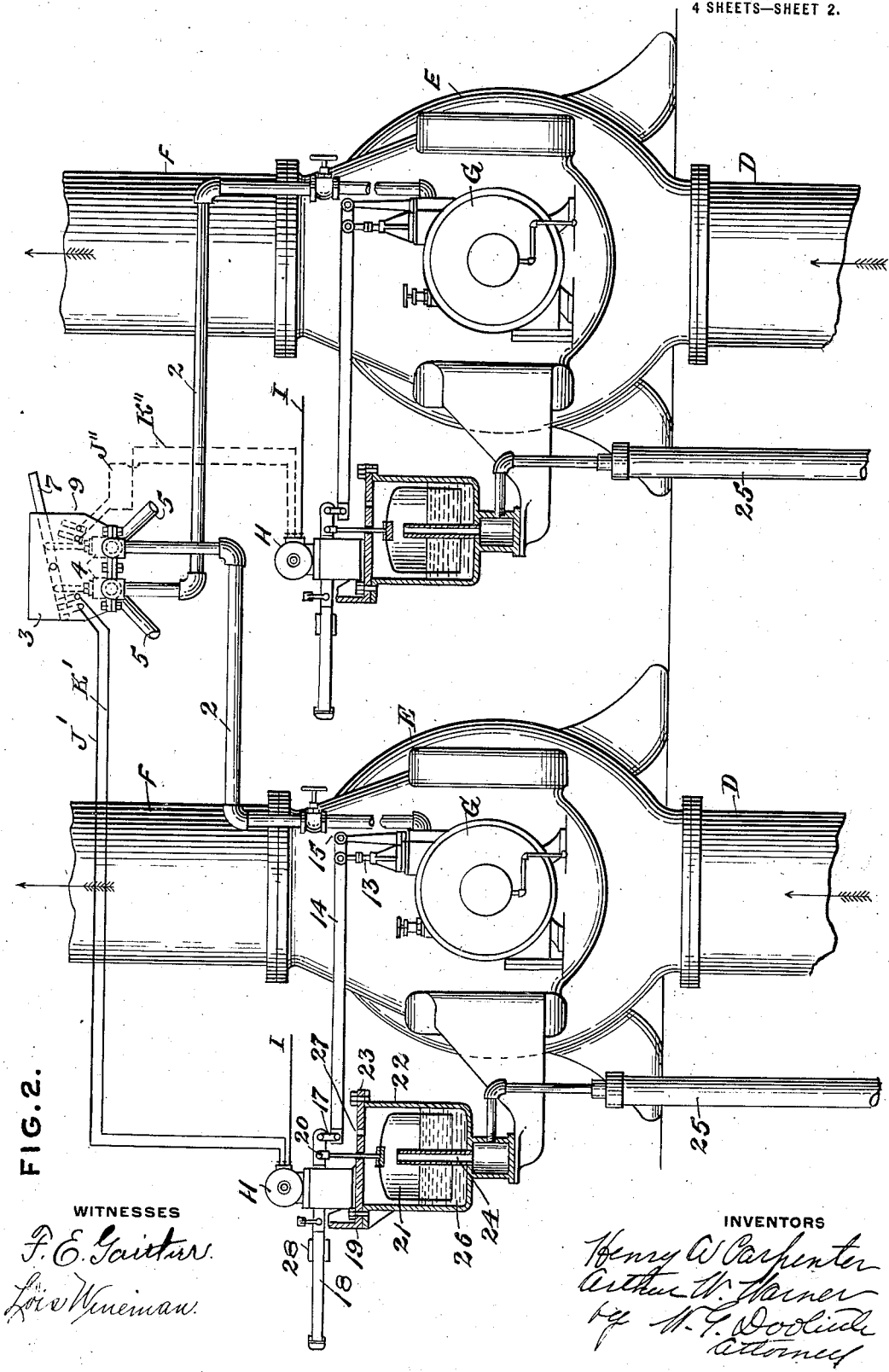

In the accompanying drawings, Figure 1 is a diagrammatic view of a series of retort benches having our improvements applied thereto; Fig. 1ª is a fragmentary elevational view of a slightly modified form of retort arrangement; Fig. 2 is a view in elevation of a pair of exhausters, together with a switch employed to admit steam pressure to either exhauster at will to cause them to operate, and to open and close the circuits leading to the motors controlling the operation of the exhausters; Fig. 3 is a plan view partly in section of the mechanism employed to regulate the exhauster valve to cause the exhauster to run at a high or low speed as desired; Fig. 4 is a longitudinal vertical section of the same taken on the line IV—IV of Fig. 3; Fig. 5, is a cross section taken on the line V—V of Fig. 3; Figs. 6 and 7 are detailed views of the valve mechanism employed when two exhausters are used; Fig. 8 is a face view of the switch controlling the motor shown in Figs. 3 and 5; Fig. 9 is a cross section of the same taken on line IX—IX of Fig. 8; and Fig. 10 is a diagrammatic view of the frame upon which said switch is located, together with the pressure indicator.

Referring first to Fig. 1, A indicates a plurality of retorts arranged in vertical rows, corresponding ones in the several rows being in horizontal alinement. Each row is shown connected to a main C through the stand pipe connections B, the main C being connected by means of a pipe D to an exhauster E provided with an outlet pipe F for conveying the gas to the washer or any other desired receptacle. The exhauster E is driven by a motor, here shown as a steam turbine G, operating under the control of an automatic governor device variably controlled by an electrically operated regulator H. Wires J and K lead from the regulator H to any desired point, and a switch L is there installed by means of which the circuits J or K may be opened or closed at will. Located adjacent to the switch L is a pressure gage M provided with a pipe N having connection through main C.

In Fig. 1ª, we have shown a construction in which the main C' is at the top instead of at the lower portion as shown in Fig. 1. In all other respects the constructions of Fig. 1 and 1ª are the same.

During the operation of plants of the character heretofore described, it is desirable that a certain predetermined pressure or a certain partial vacuum should be maintained in the main C at all times, and this pressure or partial vacuum is dependent upon an exhauster E operated by a suitable motor, as for example, steam turbine G. The speed of the exhauster and therefore its capacity will be dependent upon the speed of the turbine G, and the turbine G is controlled by means of a governing structure variably regulated by a weighted valve mechanism to be presently described, and which may be operated from the switch L, located at any desired point, either adjacent to or away from the retorts. Because gas plants of this character are commonly operated over extended periods, sometimes during the entire twenty-four hours of each day, it is desirable that some means be provided to guard against a probable shut-down at any time, and to prevent this, we have illustrated a pair of exhausters (see Fig. 2) located adjacent to each other and both connected to the main C in a manner similar to the exhauster shown in Fig. 1, each exhauster structure forming an individual unit with its individual controlling mechanism, the connections between the mechanisms and the switch L being such that a single manual control mechanism (hereinafter described in detail) may be employed for the regulation, said latter mechanism being operatively connected to either unit at will. By this arrangement, the pressure control operator, who may be located at a remote point, is not required to carefully watch the individual operations of the working exhauster, the operator having charge of the exhauster operations shifting from one unit to the other as he may deem necessary. The exhausters may be operated by means of the driving elements shown as steam turbines G to which pressure is supplied through pipes 2 leading to a source of supply. The turbines may be operated and controlled by the mechanism H to be presently described, which latter is electrically controlled as heretofore stated.

As only one of the exhausters will be used at a time, we have provided means for rendering one exhauster ineffective when the other is operated, and for this purpose, there is provided a combined steam valve device and electrical switch 3 shown in detail in Figs. 6 and 7. This valve device includes a pair of gate valves 4 connected on one side to the pipes 2 and on the other side to pipes 5 leading to a source of steam pressure. The stems 6 of valves 4 are pivotally connected to a lever 7 which in turn is pivoted at a point 8 centrally located between the valve stems, to a frame 9 as shown in Figs. 6 and 7.

The lever 7 at one side of the frame is provided with a handle and within the ends of the frame 9 with contacts 10 adapted to engage spring fingers 11 secured to insulation blocks 12 upon frame 9. The set of spring fingers 11 at one side of the frame are connected by means of the wires J' and K' to the motor on one of the exhausters, while the fingers at the opposite end of the frame have similar wires J'' and K'' leading to the motor on the other exhauster. When the lever 7 is in the position indicated in Fig. 6, the contacts to the wires J', K' leading to the left-hand exhauster motor will close the circuit and the corresponding valve will be opened to admit steam to the turbine of this exhauster. When the handle 7 is depressed, the pipe leading to the motor on the left-hand side (Fig. 2) will be closed and the circuit through wires J' and K' broken, while the pipe leading to the motor on the right-hand side will be opened admitting steam thereto, the circuit J'', K'' being closed. It will be obvious that should it be desired to use but one motor, the switch 3 may be dispensed with and the wires J', K' and pipe 2 lead direct to their source of supply. The current from wires J and K may pass from 49 and 49' through the set of levers 34, (Fig. 9) to binding posts 47 through wires J' and K' to motor, or from 49 and 49' through levers 35, through wires J' and K' to the motor, through binding posts 48 in reverse direction, dependent upon which set of levers is depressed.

As shown by Figs. 2, 3, 4 and 5, it will be seen that a valve operated by valve stem 13 will respond to the movement of a horizontally disposed lever 14 fulcrumed at 15. The outer end of lever 14 is connected by means of a link 17 to a frame 18. The frame 18 is fulcrumed near its center to the standard 19, and is provided adjacent link 17 with a depending link 20 which in turn is connected at its lower end to an inverted open-bottom float 21 adapted to operate in a casing 22. Casing 22 is provided with a cover 23 adapted to support the standard 19 of frame 18, and is provided at its lower end with a vertical pipe 24 extending up and into float 21. Pipe 24 is in direct communication with large pipe C through the medium of a small pipe 25. The lower end of float 21 is submerged in a suitable fluid 26, said fluid being of such depth as to form a seal and to provide a suitable space between its top surface and the top of the float 21, into which space pipe 24 extends. Cover 23 is provided with an opening 27 leading to the atmosphere, and it will be seen from the above, that float 21 always has atmospheric pressure upon the outside opposed by the pressure of pipe C on the inside, and, through the connections described, acts as a governor for the exhauster motor. The frame 18 is provided near its outer end with a sliding weight 28 adapted to be operated by means of a screw 29. Motion is imparted to said screw, when it is desired to shift the weight, by means of an electric motor 30 (which may be the regulating motor H of Figs. 1 and 2) provided with a slip clutch 31 operated by worm 32, which latter is provided with a gear 32ª which meshes with a gear 32ᵇ mounted on the motor shaft, and a universal shaft connection 33 leading from the slip clutch to screw 29, as clearly shown in Figs. 3 and 4. Motor 30 may be started or stopped or made to operate in either direction by the manipulation of switch L as will be well understood by those skilled in the art, and the operation of which switch will be presently described. As will be understood, the shifting movements of the weight 28 have an effect on the operation of the governor, and if the length of movements be sufficient, the action of the governor may effect a closure of the valve to the motor G, although this action is normally provided by a suitable manual shut-off valve in the supply pipe leading to the motor.

In Figs. 8 and 9, the switch L is shown as consisting of two oppositely disposed arms 34 and 35 which cross each other at their inner ends and are pivotally mounted as shown at 36 upon a box 37. The inner ends of switches 34 and 35 cross each other and are provided with oppositely disposed projections 38 and 39 respectively adapted to engage the edges of the switches in such a manner that when one switch is turned upon the pivot 36, it will be impossible to turn the other switch thereon, as shown in Fig. 9. Switches 34 and 35 are provided with push buttons 40 and 41 adapted to slide upon pins 42 and 43 secured to box 37. Springs 44 are interposed between the ends of rods 42 and 43 and buttons 40 and 41, and act to keep the switches thrown out in open position. Located upon the outer ends of switches 34 and 35 are contact points 45 and 46, respectively adapted to engage binding posts 47 and 48 secured to frame 37. Each switch of the five shown in Fig. 8 includes two levers 34 and two levers 35, and corresponding contacts and binding posts. The pivot points 36 of each of the levers is attached to the inner ends of the binding posts 49 and 49'. The circuit from wire I is continued direct from source to motor, while wires J and K from the generator are connected to binding posts 49 and 49' respectively. In the normal position of the switch shown in Fig. 9, circuits J and K are both broken with motor 30 and weight 28 at rest. By pushing upon either of buttons 40 or 41, motor 30 will be caused to operate clockwise or in the opposite direction, and in so doing, will shift weight 28 to the right or left as desired. In order that the machine may not be injured by the screw 29 continuing to rotate when the weight 28 has reached the limit of its movement, a slip clutch 31 is provided which may be of any preferred construction. It will also be seen that when one of the switches 34 or 35 is pressed to close its circuit, it will be impossible to press the other switch far enough to close its circuit on account of projections 38 and 39, and for this reason, it is impossible to push both switches in at the same time.

It will be readily understood that switches of the character just described are applicable for controlling the various motors connected with a gas plant, and we have accordingly shown in Fig. 8, five of such switches mounted in a common box which in turn is supported upon a suitable frame 50 which also supports the pressure gage M and the various gages leading to the other parts of the apparatus, but which do not form a part of the present invention, is shown diagrammatically in Fig. 10.

By referring to the gage M, the operator may determine the pressure in the main C, because the pipe N in communication therewith will indicate the pressure from the stylus M' on the piston within the casing M². The position of the stylus with respect to the chart of the gage M will indicate the pressure within the main and the pressure at some particular horizontal row of retorts, this latter result being due to the differences in pressure which are present at the different elevations in the stand pipe. The operator being aware of the particular pressure which the elevation in a horizontal row of retorts bears to the pressures at the elevations of the remaining rows is able, when made aware that a particular horizontal row of retorts is to be charged or discharged, or the doors opened for any purpose, to vary the operation of the exhauster so as to provide the equilibrium between the atmosphere and the retort pressure by operating the switch shown in Fig. 9 so as to cause an increase in speed of the motor for the exhauster or a reduction in the speed thereof as the case may require, until the stylus indicates on the dial that the proper pressure is maintained in the pipe C, stand pipe B, and the particular row of retorts to be charged or discharged. When this pressure has been obtained, the circuit is broken and the proper speed of the motor and of the exhauster will be maintained through the action of the governor until it is desired to again change the pressure. If, however, there is a drop in pressure in main C due to a falling off of the accumulation of gas or from any other cause, the drop in pressure will exist in the pipe communicating with the casing 22 of the float 21. The drop in pressure under the float 21 will cause the float to drop on account of the preponderance of pressure due to the atmosphere, and the lever 14 will move the valve on the stem 13 so that the steam to the turbine will be throttled and the speed thereof reduced. If, on the other hand, there is an excess of pressure in the main C, the float 21 will be raised causing the lever 14 to impart motion to the valve stem 13 so as to admit more steam to the turbine, thereby increasing the speed thereof, and increasing the capacity of the exhauster so as to compensate for this extra pressure and carry the gas off at a greater rate per given time. It will be apparent that by this means the pressure in the main C and at the entrance of the selected row of retorts will be maintained irrespective of variations of pressure accumulations in the pipe, and that after the device has once been set for a given pressure, this pressure will remain constant. The variation in pressure in the main C when brought about either by design or accident will be indicated by means of the gage M, and should it be found necessary to maintain a different pressure or partial vacuum in the main C, it is only necessary that the operator press the proper button 40 or 41 to close the particular circuit in which they appear long enough to shift the weight 28 in the proper direction until the operator is apprised that the proper pressure has been provided in the main C (as will be indicated on the gage M), when he may release the button causing the circuit to the motor to be broken by the action of the spring 44, and the weight 28 will remain at the position on the lever to which it was moved by the action of its motor.

As will be seen, the structure herein disclosed embodies a work performing apparatus and its individual control (the exhauster, its motor and the valve for the motor), which apparatus is adapted to maintain a predetermined standard under variable work performing conditions (the operation of the exhauster designed to maintain a predetermined pressure in the main under conditions which are variable), apparatus variable under such condition variations (the bell 21), means interposed between the variable apparatus and the individual control and operated by the variations of the variable apparatus for manipulating the control to restore such standard by changing the work performing apparatus operation (the leverage system between the valve and the bell 21), and a motor actuated shiftable weight for varying said standard at will (the regulating motor H, the shiftable weight 28, and the intervening mechanism between these parts).

From the foregoing, it will be apparent that the exhauster which is the controlling element for the main C is under the control of the motor G which in turn is responsive to the electrically operated starting device and a pressure actuated governor.

What we claim is:—

1. The combination with a plurality of gas retorts, a gas main, and a connection between the gas main and the interior of said retorts, of means for maintaining the pressure in a predetermined retort in substantial equilibrium with the atmospheric pressure adjacent thereto.

2. The combination with a plurality of gas retorts, a main, a conduit connection between the retorts and the main, an exhauster for the main, means for driving the exhauster, and means responsive to variations of pressure in the main for determining the speed of the exhauster, said means including mechanism for establishing substantial equilibrium in pressure between a predetermined retort and the atmosphere.

3. The combination with a plurality of retorts, and a gas main in communication with the retorts, of an exhauster for the main, a governor for automatically controlling the speed of the exhauster under variations in main conditions, and means whereby the speed of the exhauster may be varied independent of variations in main conditions from a point remote from the exhauster.

4. The combination with a plurality of retorts, and a gas main in communication with the retorts, of an exhauster for the main, a governor for automatically controlling the speed of the exhauster under variations in main conditions, and means whereby the speed of the exhauster may be varied independent of variations in main conditions from a point remote from the exhauster, said means being operative through the governor.

5. The combination with a plurality of retorts, and a gas main in communication with the retorts, of an exhauster for the main, a governor for automatically controlling the speed of the exhauster under variations in main conditions, and means whereby the speed of the exhauster may be varied independent of variations in main conditions, said means including a shiftable weight.

6. The combination with a plurality of retorts, and a gas main in communication with the retorts, of an exhauster for the main, a governor for automatically controlling the speed of the exhauster under variations in main conditions, and means whereby the speed of the exhauster may be varied independent of variations in main conditions, said means including a shiftable weight operative within the governor.

7. The combination with a plurality of retorts, and a gas main in communication with the retorts, of an exhauster for the main, a governor for automatically controlling the speed of the exhauster under variations in main conditions, and means whereby the speed of the exhauster may be varied independent of variations in main conditions, said means including a motor-driven shiftable weight.

8. The combination with a plurality of retorts, and a gas main in communication with the retorts, of an exhauster for the main, a governor for automatically controlling the speed of the exhauster under variations in main conditions, and means whereby the speed of the exhauster may be varied independent of variations in main conditions, said means including a shiftable weight, and a motor operable at will to shift the weight.

9. The combination with a plurality of retorts, and a gas main in communication with the retorts, of an exhauster for the main, a governor for automatically controlling the speed of the exhauster under variations in main conditions, and means whereby the speed of the exhauster may be varied independent of variations in main conditions, said means including a shiftable weight, and a motor operable at will to shift the weight, the operation of said motor being controlled from a remote point.

10. The combination with a plurality of retorts, and a gas main in communication with the retorts, of an exhauster for the main, a governor for automatically controlling the speed of the exhauster under variations in main conditions, means whereby the speed of the exhauster may be varied independent of variations in main conditions, said means including a shiftable weight, and means for limiting the length of shifting movements of the weight.

11. The combination with a plurality of retorts, and a gas main in communication with the retorts, of an exhauster for the main, a governor for automatically controlling the speed of the exhauster under variations in main conditions, and means whereby the speed of the exhauster may be varied independent of variations in main conditions, said exhauster including a prime mover and its control, said governor including a system of levers connected to said control.

12. The combination with a plurality of retorts, and a gas main in communication with the retorts, of an exhauster for the main, a governor for automatically controlling the speed of the exhauster under variations in main conditions, and means whereby the speed of the exhauster may be varied independent of variations in main conditions, said exhauster including a prime mover and its control, said governor including a system of levers connected to said control, said means including a shiftable weight coöperating with said lever system.

13. The combination with a plurality of retorts, and a gas main in communication with the retorts, of an exhauster for the main, a governor for automatically controlling the speed of the exhauster under variations in main conditions, and means whereby the speed of the exhauster may be varied independent of variations in main conditions, said exhauster including a prime mover and its control, said governor including a system of levers connected to said control, said means being operative through said lever system.

14. The combination with a plurality of retorts, a main, a conduit connection between the retorts and the main, an exhauster for the main, a governor-controlled motor driving the exhauster, and electrically operated means additional to the governor for controlling the speed of the motor.

15. The combination with a plurality of retorts, a main, means communicating with the retorts and the main, an exhauster, a motor therefor, a starting device for the motor operable at will, and a pressure actuated governor positively connected to the starting device.

16. In combination with a bench of retorts, of a main common to all of the retorts, means for automatically maintaining a predetermined pressure in the main, and motor operated adjustable means for regulating the pressure maintaining means.

17. In combination with a bench of vertically disposed retorts, of a stand pipe common to all of the retorts, a main, an exhauster connected to the main, and means for regulating the exhauster to accommodate for the pressure of individual retorts.

18. In combination with a bench of vertically disposed retorts, of a stand pipe common to all of the retorts, a main an exhauster connected to the main, a balanced valve for regulating the speed of the exhauster, and motor operated means for varying the working pressure of said valve.

19. In combination with a bench of vertically disposed retorts, of a stand pipe common to all of the retorts, a main, an indicator connected to the main, an exhauster connected to the main, a float valve for regulating the speed of the exhauster, electrical means for varying the working pressure within the main, and means located adjacent the indicator for controlling the electrical valve regulating means.

20. The combination with a plurality of gas retorts, and a gas main in communication with the retorts, of individual units each adapted to automatically maintain pressure in the retorts in substantial equilibrium with the atmospheric pressure adjacent the retorts, a control mechanism for varying the operative pressures of the units, and means for operatively connecting the control mechanism to either unit at will.

21. In control mechanism, the combination with work-performing apparatus and its individual control, said apparatus being adapted to maintain a predetermined standard under variable work-performing conditions, of apparatus variable under such condition-variations, means interposed between said variable apparatus and the individual control and operated by the variations of the variable apparatus for manipulating the control to restore such standard by changing the work-performing apparatus operation, and a motor-actuated shiftable weight for varying said standard at will.

22. In control mechanism, the combination with work-performing apparatus and its individual control, said apparatus being adapted to maintain a predetermined standard under variable work-performing conditions, of apparatus variable under such condition-variations, means interposed between said variable apparatus and the individual control and operated by the variations of the variable apparatus for manipulating the control to restore such standard by changing the work-performing apparatus operation, a motor-actuated shiftable weight for varying said standard at will, and means for manually controlling the operations of said motor.

23. In control mechanism, the combination with work-performing apparatus and its individual control, said apparatus being adapted to maintain a predetermined standard under variable work-performing conditions, of apparatus variable under such condition-variations, means interposed between said variable apparatus and the individual control and operated by the variations of the variable apparatus for manipulating the control to restore such standard by changing the work-performing apparatus operation, a motor-actuated shiftable weight for varying said standard at will, and means for manually controlling the operations of said motor, said latter means being remote from the motor.

24. In gas manufacturing apparatus, a plurality of retorts, a gas main, an exhauster for the main, a pressure control apparatus connected to the main and adapted to control movements of the exhauster, said apparatus including a system of leverage and a frame connected thereto, a weight mounted in said frame and operatively connected to a threaded rod, and a motor for operating said rod to thread the weight, said motor being operable at will.

In testimony whereof we affix our signatures in presence of two witnesses.

HENRY A. CARPENTER. [L. S.]
ARTHUR W. WARNER. [L. S.]

Witnesses:
J. L. HAFNER,
ADA M. STEELE.